United States Patent [19]

Aoyama

[11] 4,316,089
[45] Feb. 16, 1982

[54] METHOD OF STABILIZING OPERATION OF A HYBRID SPARK CHAMBER

[75] Inventor: Takahiko Aoyama, Nagoya, Japan

[73] Assignee: Nagoya University, Nagoya City, Japan

[21] Appl. No.: 161,251

[22] Filed: Jun. 20, 1980

[30] Foreign Application Priority Data

Jun. 26, 1979 [JP] Japan .................................. 54/79616

[51] Int. Cl.³ ............................................ G01T 1/185
[52] U.S. Cl. .................................... 250/385; 250/389
[58] Field of Search ............................... 250/389, 385

[56] References Cited

U.S. PATENT DOCUMENTS 3,717,766  2/1973  Allard et al. ......................... 250/389

FOREIGN PATENT DOCUMENTS 1908864  9/1970  Fed. Rep. of Germany .

OTHER PUBLICATIONS

"Nuclear Instruments and Methods", vol. 150, 1978, No. 2, pp. 203-208, North-Holland Publishing Co.

Primary Examiner—Davis L. Willis
Attorney, Agent, or Firm—Ladas & Parry

[57] ABSTRACT

A method of stabilizing operation of a hybrid spark chamber is disclosed. The method is applied to a self-triggering hybrid spark chamber of the gas-flow type including a spark chamber portion and a proportional chamber portion, and utilizes a high speed discharge circuit for the proportional chamber portion, the high speed discharge circuit being so constructed that upon generation of a precedent spark in the spark chamber portion by electrons produced by radiation and multiplied in the proportional chamber portion the discharge circuit is simultaneously operated in response to the spark so as to rapidly lower an electric field intensity of the proportional chamber portion, thereby preventing the generation in the proportional chamber of any induced spark.

2 Claims, 6 Drawing Figures

METHOD OF STABILIZING OPERATION OF A HYBRID SPARK CHAMBER

BACKGROUND OF THE INVENTION

The present invention relates to a method of stabilizing the operation of a hybrid spark chamber by adding a high speed discharge circuit to a proportional chamber portion of the hybrid spark chamber used as a radiation image detector such as a $\beta$-ray camera or the like, operating the high speed discharge circuit every time when a spark is generated in the spark chamber portion so as to instantaneously decrease an electric field intensity of the proportional chamber portion, and preventing the proportional chamber portion from generating any induced spark, so as to prevent generation of spurious sparks independently of radiation.

Recently, in the fields of biochemistry, pharmacology or the like, together with development of autoradiography, radiochromatography or the like, in order to measure distribution of radioactive isotopes separated on a plane in a short time, use has been made of a $\beta$-ray camera for carrying out an imaging by detecting the position of charged particle radiation (mainly $\beta$-rays) radiated from a sample.

As such a radiation position detector, there is a self-trigger type spark chamber, which is considered to be most excellent in detectors available at present in convenience, high resolution, high detection efficiency to charged particle radiation such as $\beta$-rays or the like. However, a spark chamber having a usual two-electrode structure easily generates spurious sparks independently of radiation and has difficulty in obtaining stability of the necessary action in practice. As a detector for solving such difficulty, there has been proposed a spark chamber having a hybrid structure by adding a parallel and flat plate type proportional chamber in front of the common parallel and flat plate type two-electrode spark chamber so as to operate the spark chamber with lower electric field intensity than usual (Japanese Patent Laid-open No. 30,380/78). This hybrid spark chamber has convenience, high detection efficiency and high resolution, and improves non-uniform sensitivity and instability of the operation, but has such a drawback that a spark is induced in the proportional chamber portion by the generation of a precedent spark in the spark chamber portion.

In such a conventional hybrid spark chamber, in order to obtain good stability, it is necessary to avoid fine dust or organic contamination deposited on the cathode surface of the proportional chamber portion, but in the case of using it as a $\beta$-ray camera, when the cathode of the proportional chamber portion is made to contact with a sample to be measured without providing any window, it is impossible to avoid any deposit of fine dust on the cathode surface, and with the existence of an induced spark, an organic substance contained in a working gas is burnt on the cathode surface, so that it is difficult to maintain the clean surface state.

If such induced spark is generated, an electron emission source for causing generation of a spurious spark is locally formed on the cathode of the proportional chamber portion, so that instability of the operation caused by the hybrid spark chamber cannot completely be eliminated.

SUMMARY OF THE INVENTION

It is an object of the present invention to eliminate the above described disadvantages of the conventional hybrid spark chamber.

It is another object of the present invention to prevent generation of an induced spark in the proportional chamber portion which has been a problem in the above-mentioned conventional hybrid spark chamber.

It is further object of the present invention to provide a method for highly stabilizing the operation of a hybrid spark chamber by adding a high speed discharge circuit to the proportional chamber portion so as to remarkably improve stability of the operation of the hybrid spark chamber.

The present invention has been accomplished on the basis of the fact that no induced spark is generated when the electric field intensity of the proportional chamber portion is lower than a certain value (threshold value) mainly determined by the kind of working gas and the gap between electrodes, such induced spark being generated slightly later than the precedent spark of the spark chamber portion, and if the electric field intensity of the proportional chamber portion is made lower than the threshold value before the generation of an induced spark, generation of this induced spark can be prevented.

The present invention provides a method for stabilizing the operation of a hybrid spark chamber. A high speed discharge circuit is provided for a proportional chamber portion of a self-trigger type hybrid spark chamber having a spark chamber portion and the proportional chamber portion, a precedent spark is generated in the spark chamber portion by electrons produced by radiation and multiplied in the proportional chamber portion, and the discharge circuit is simultaneously operated in response to the spark so as to rapidly decrease an electric field intensity of the proportional chamber portion, thereby preventing the proportional chamber portion from generating any induced spark.

According to the present invention, a high speed discharge circuit is added to a proportional chamber portion in parallel, this discharge circuit is triggered by a precedent spark signal in a spark chamber portion, and an electric field intensity of the proportional chamber portion is made lower than the threshold value before generation of the induced spark, thereby suppressing generation of the induced spark and obtaining extremely high stability of the operation.

The reason why such good result is obtained is summarized as follows. In general, in a self-trigger type spark chamber, the cause for generating a spurious spark causing instability of the operation is due to electron emission from a cathode under the influence of an electric field. Particularly, if a high resistive metal oxide or organic contaminative film is existent on the surface of a cathode, a positive charge is accumulated on these films after each spark, the electric field intensity on the cathode is locally and considerably intensified, and electron emission becomes vigorous at such portions. In the spark chamber portion of the above-described hybrid spark chamber, however, an electric field low enough to generate any spark singly is applied thereto, so that the electron emission from the cathode of the spark chamber portion cannot be a cause for a spurious spark. The electron emission from the cathode of the proportional chamber portion, therefore, becomes a problem, but the proportional chamber portion becomes of low electric field intensity because of the provision of a high speed discharge circuit, so that no induced spark is generated, and any generation of a spurious spark caused by accumulation of a positive charge on the cathode of the proportional chamber portion can completely be prevented. According to the method of the present invention, therefore, it is possible to obtain good stability of the operation.

Moreover, according to the present invention, no induced spark is generated in the proportional chamber portion, so that even if a considerable organic contamination is existent on the cathode surface of the proportional chamber portion, it is assured that no bad influence is given thereby to the stability of the operation.

BRIEF DESCRIPTION OF THE DRAWINGS

FIG. 5 shows the state of distribution of spark light spots due to the existence of a high speed discharge circuit at $V_s = 5.55$ KV with the use of the same sample and the same operational condition as in FIG. 4, in which

DESCRIPTION OF THE PREFERRED EMBODIMENT

Figure 1:
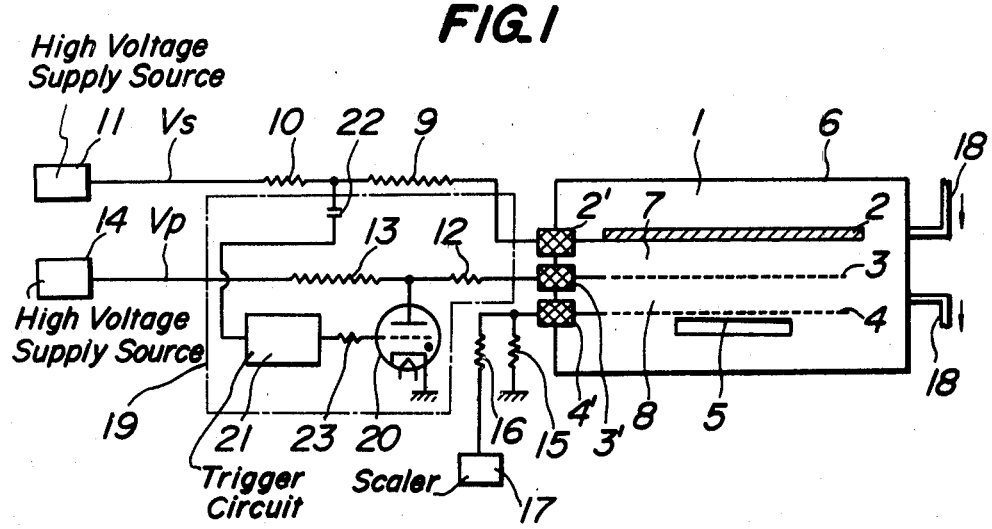
FIG. 1 is an explanatory view showing an outline of the construction of an apparatus for carrying out a method of stabilizing the operation of a hybrid spark chamber according to the present invention.

Referring now to the drawing one embodiment of a method of stabilizing the operation of a hybrid spark chamber according to the present invention will be explained.

FIG. 1 is a circuit diagram showing an outline of a hybrid spark chamber and its high speed discharge circuit for carrying out the method of the present invention. In FIG. 1, a hybrid spark chamber 1 is provided with three parallel and flat plate electrodes 2, 3 and 4 at intervals of 5 mm with each other, a sample 5 to be measured is arranged beneath the electrode 4, all of them being accommodated in an working gas sealed container 6, and a space is provided between the electrodes 2 and 3 which serves as a spark chamber 7 while a space provided between the electrodes 3 and 4 serves as a proportional chamber 8. The electrode 2 is composed of electroconductive glass, its through-terminal 2' is connected to a high voltage supply source 11 through a discharge quenching high resistance 9 and a low resistance 10, and a high voltage $V_s$ is applied thereto. The electrode 3 is composed of stainless steel gauze (200 mesh), its through-terminal 3' is connected to a high voltage supply source 14 through a low resistance 12 and a discharge quenching high resistance 13, and a high voltage $V_p$ is applied thereto. The electrode 4 is also composed of stainless steel gauze (200 mesh), its through-terminal 4' is grounded through a resistance 15 and further connected to a scaler (counting circuit) 17 through a resistance 16. As a working gas, use is made of a mixed gas of argon and ethyl alcohol (saturated vapor at 0° C.), which is flowed in the direction of an arrow through a conduit 18 at room temperature and atmospheric pressure.

Figure 2:
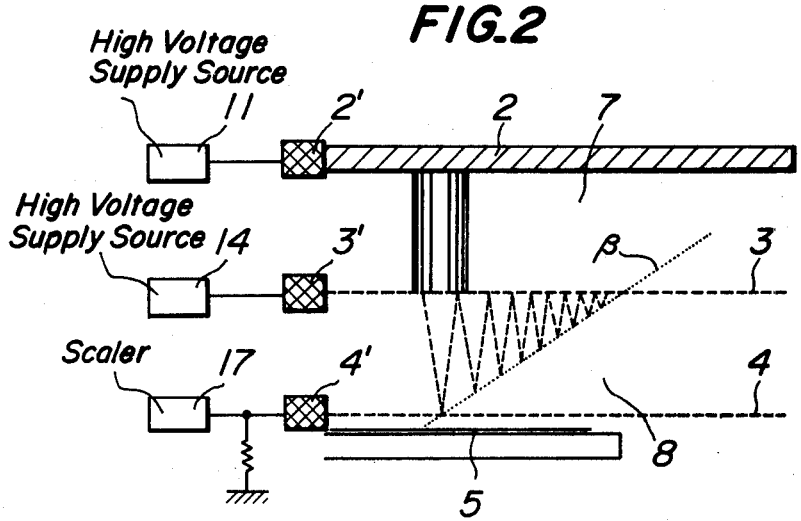
FIG. 2 is an exlanatory view showing the operation of a hybrid spark chamber.

An operating mechanism of such hybrid spark chamber is as follows. As shown in FIG. 2, when $\beta$-rays emitted from the sample 5 placed in parallel to the electrode surface at the position of about 1 mm beneath the electrode 4 are passed through meshes of the electrode 4, the working gas is ionized between the electrodes 3 and 4 along its track. In this case, the produced electrons are considerably multiplied by a high electric field between the electrodes 3 and 4, and when a part of the electrons is passed through meshes of the electrode 3, the precedent spark is generated between the electrodes 2 and 3. This precedent spark induces a spark in the proportional chamber portion 8 between the electrodes 3 and 4.

In order to prevent generation of such induced spark, according to the invention, a high speed discharge circuit 19 is connected to the proportional chamber portion 8 of the hybrid apark chamber 1 in parallel. This high speed discharge circuit 19 comprises a thyratron 20 and a trigger circuit 21. That is, an anode of the thratron 20 is connected to a junction point of the resistance 12 and the discharge quenching resistance 13 connected to the electrode 3 of the hybride spark chamber 1, a cathode of the thyratron being grounded, so that the thyratron 20 is connected to the proportional chamber portion 8 in parallel. Moreover, a series circuit of a capacitor 22, a trigger circuit 21 and a resistance 23 is connected between the junction point of the resistances 9 and 10 connected to the electrode 2 and a grid of the thyratron 20.

As such thyratron, use is made of a high voltage and high current hydrogen-contained thyratron having an ionization time of less than about 0.1 $\mu$sec, and as its trigger signal, use may be made of a voltage drop caused in the electrode 2 by the precedent spark generated in the spark chamber portion 7.

Figure 3:
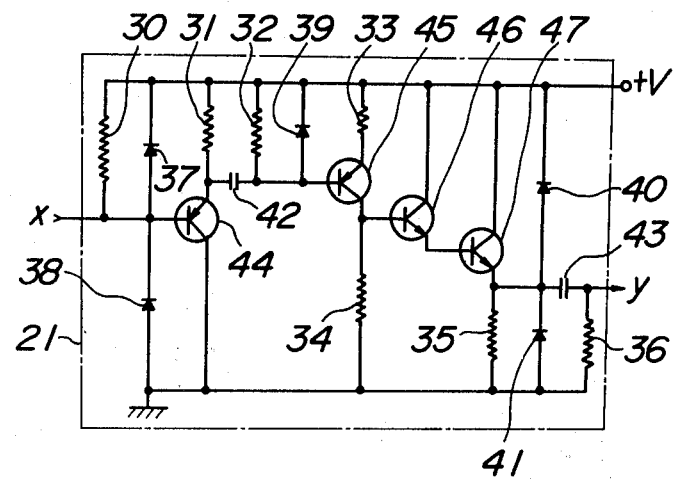
FIG. 3 is a wiring diagram showing one embodiment of a trigger circuit used in the apparatus shown in FIG. 1.

The polarity of a trigger signal obtained from the electrode 2 is negative, but a drive input of the grid of the thyratron 20 is to be a pulse having positive polarity and peak value more than 175 V. Therefore, in order to satisfy this input condition, the trigger circuit 21 is connected to the grid of the thyratron 20. The trigger circuit 21 is a conventional trigger circuit using a high speed transistor as shown in FIG. 3, so that the explanation of its operation is omitted. In FIG. 3, reference numerals 30 to 36 show resistors, 37 to 41 diodes, 42 and 43 capacitors, and 44 to 47 transistors. A signal obtained from the electrode 2 by this trigger circuit is converted to a pulse having positive polarity and very quick rise time with a peak value of about 180 V.

The time intervals after generation of the precedent spark in the spark chamber portion 7 up to generation of an induced spark in the proportional chamber portion 8 was 0.2 $\mu$sec when using the above-described working gas.

According to the present invention, with the provision of a high speed discharge circuit, the total delay time after generation of the precedent spark up to operation of the discharge circuit is about 0.1 $\mu$sec, so that the condition for operating the discharge circuit within 0.2 $\mu$sec after the precedent spark can fully be satisfied.

Figure 4:
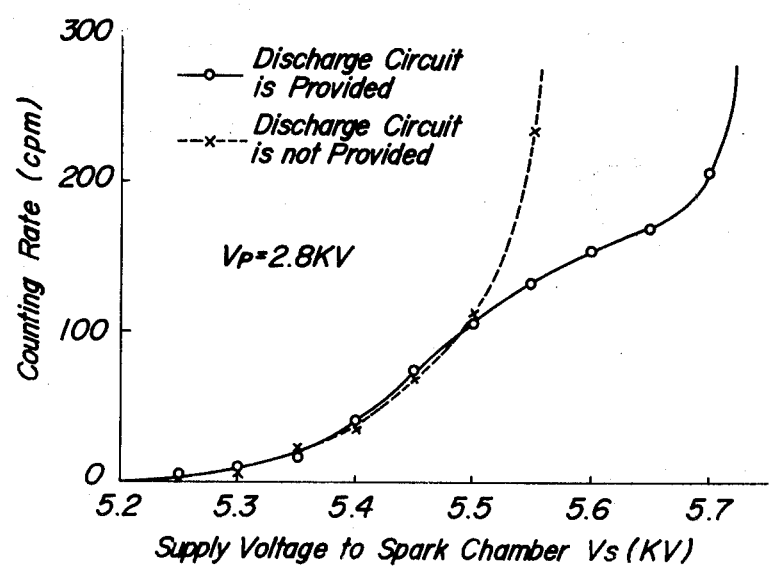
FIG. 4 is a characteristic diagram showing a curve of a counting characteristic due to the existence of a high speed discharge circuit for a $^{60}Co$ $\beta$-ray sample.

A result of experiment by the method according to the present invention is shown as follows. In general, the instability of the operation in the spark chamber becomes conspicuous when an incident intensity of radiation is low, so that with the use of a sample having a low radiation intensity, for example a $^{60}Co$ $\beta$-ray sample, a difference of counting characteristics caused by the existence of a discharge circuit is examined, and a result of the discharge circuit influence upon the stability of the operation of the spark chamber is further examined. FIG. 4 shows a relation between a counting rate (cpm) and an applied voltage $V_s$ in case of applying a high voltage $V_p$ of 2.8 KV to the proportional chamber portion 8. A cathode (electrode 4) of the proportional chamber portion 8 used herein is intentionally contaminated with an organic substance on the cathode surface by adhering four layers (about $10^{-6}$ cm) of a stearic acid monomolecular film to the whole surface, but without the use of no high speed discharge circuit shows no existence of any plateau on a counting characteristic curve as shown by a dotted line in FIG. 4, and the operation becomes unstable. In case of using the high speed discharge circuit according to the present method, as shown by a solid line in FIG. 4, the preferably stable operation can be obtained. If a value of the applied voltage $V_s$ to the spark chamber portion is more than 5.7 KV, a value of a counting rate by a spurious spark is remarkably increased and the operation becomes unstable, because the electric field intensity between the electrodes 2 and 3 becomes strong enough to independently generate a spark between the electrodes 2 and 3, so that in case of making a value of the applied voltage $V_p$ 2.8 KV, a value of the applied voltage $V_s$ should be less than 5.7 KV.

Figure 5A:
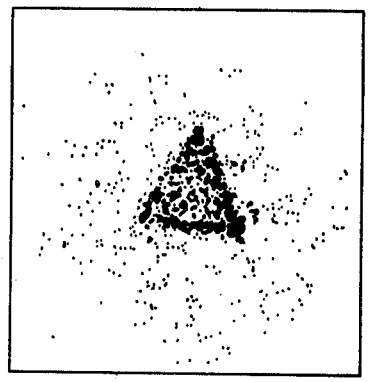
FIG. 5a shows the case of using the discharge circuit and FIG. 5b shows the case of using no discharge circuit.
Figure 5B:

At the applied voltage $V_s$=5.55 KV in which the stability becomes conspicuously lower in case of using no high speed discharge circuit as shown in FIG. 4, distribution of spark light spots is photographed by a usual optical camera (not shown) mounted above the electrode 2, and the quality of an image caused by the existence of the discharge circuit is examined. A result thereof is shown in FIG. 5, in which the sample is made by distributing $^{60}Co$ into an equilateral triangle having each side of 2 cm. In case of not using the discharge circuit as shown in FIG. 5b, it is found that the image is considerably contaminated by generation of a spurious spark, but in case of using the discharge circuit as shown in FIG. 5a, it is found that an image faithful to the sample can be obtained.

According to the present invention, the operation is remarkably stabilized by only connecting the high speed discharge circuit to the hybrid spark chamber. This high speed discharge circuit can detachably be mounted on the hybrid spark chamber as an external circuit, and can be accommodated in the hybrid spark chamber. When the discharge circuit is used as an external circuit, it is possible to attach it to a hybrid spark chamber already available on the market.

The present invention is not limited to the above described embodiments but can variously be modified. For example, as a discharge circuit, it is a matter of course to use any kind of discharge elements which can discharge almost all charges accumulated in an electrostatic capacitance of the proportional chamber before generation of an induced spark and after generation of the precedent spark at high speed under a desired condition. As a working gas sealed in the hybrid spark chamber, besides the mixed gas described in the above embodiments, use may be made of various gas mixtures. As a radiation to be measured, not only $\beta$-ray but also $\alpha$-ray, $\gamma$-ray, X-ray or the like can be measured. As a trigger circuit, use may be made of any circuit which can satisfy a desired condition of triggering discharge elements.

What is claimed is:

1. A method of stabilizing the operation of a gas-flow type self-triggering hybrid spark chamber having a spark chamber portion and a proportional chamber portion, and in which electrons produced by radiation are multiplied in the proportional chamber portion and generate sparks in the spark chamber portion, said method comprising connecting a high speed discharge circuit to the proportional chamber portion and utilizing the discharge of said circuit to lower the electric field intensity of said proportional chamber portion below a threshold value at the above which it is solely possible for a spark to be induced in said proportional chamber portion by a spark generated in said spark chamber portion, said discharge being initiated in response to each spark generated in said spark chamber portion and before the instant at which a surrounding induced spark in said proportional chamber portion would otherwise occur.

2. A method according to claim 1, wherein the discharge of a hydrogen thyratron in said circuit is utilized to effect said lowering of the electric field intensity of said proportional chamber portion.

* * * * *

UNITED STATES PATENT AND TRADEMARK OFFICE
CERTIFICATE OF CORRECTION

PATENT NO. : 4,316,089

DATED : February 16, 1982

INVENTOR(S) : Takahiko AOYAMA

It is certified that error appears in the above—identified patent and that said Letters Patent is hereby corrected as shown below:

Claim 1, line 11, change "the" to --and--.

line 16, change "surrounding" to --succeeding--.

Signed and Sealed this

Twenty-seventh Day of April 1982

[SEAL]

Attest:

GERALD J. MOSSINGHOFF

*Attesting Officer*  *Commissioner of Patents and Trademarks*